(12) United States Patent
Ridgway et al.

(10) Patent No.: US 12,288,025 B1
(45) Date of Patent: Apr. 29, 2025

(54) SYSTEMS AND METHODS FOR GENERATING AND EDITING MESSAGES

(71) Applicant: BRAZE, INC., New York, NY (US)

(72) Inventors: Jesse Ridgway, New York, NY (US); Abraham Darwish, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 18/777,954

(22) Filed: Jul. 19, 2024

(51) Int. Cl.
*G06F 40/166* (2020.01)
*G06F 3/0482* (2013.01)
*G06F 40/40* (2020.01)
*G06Q 30/01* (2023.01)
*H04L 51/063* (2022.01)

(52) U.S. Cl.
CPC ............ *G06F 40/166* (2020.01); *G06F 40/40* (2020.01); *G06Q 30/01* (2013.01); *H04L 51/063* (2013.01); *G06F 3/0482* (2013.01)

(58) Field of Classification Search
CPC ...... G06F 40/166; G06F 40/40; G06F 3/0482; G06Q 30/01; H04L 51/063
See application file for complete search history.

(56) References Cited

U.S. PATENT DOCUMENTS

| | | | | |
|---|---|---|---|---|
| 10,474,511 | B1* | 11/2019 | Hicks | H04L 51/046 |
| 11,444,896 | B1* | 9/2022 | Kwon | H04L 51/216 |
| 2014/0244429 | A1* | 8/2014 | Clayton | G06Q 30/0631 |
| | | | | 705/26.7 |
| 2021/0400008 | A1* | 12/2021 | Khan | H04L 51/063 |
| 2023/0274312 | A1* | 8/2023 | Raviv | G06Q 30/0201 |
| | | | | 705/14.45 |

* cited by examiner

*Primary Examiner* — Quoc A Tran
(74) *Attorney, Agent, or Firm* — FisherBroyles, LLP

(57) ABSTRACT

Systems and methods for generating a message that is to be sent electronically to a user include the use of an artificial intelligence or large language model (AI/LLM) service to provide recommendations about how a message could be changed to improve customer engagement with the message. The systems and methods can present an individual generating the message with options for making changes to a draft of the message, and the individual can then select the changes that are to be made to create a final version of the message. In some instances, the systems and methods include analyzing the change recommendations provided by a AI/LLM service to ensure they will actually improve customer engagement and not clash with or impair the original purpose of the message.

22 Claims, 14 Drawing Sheets

FIG. 9

SYSTEMS AND METHODS FOR GENERATING AND EDITING MESSAGES

BACKGROUND OF THE INVENTION

The invention is related to systems and methods for generating and editing messages that can be sent electronically to a company's users or customers.

Companies often hire a customer engagement service—also called a customer relationship management service—to help manage the delivery of information and messages to their customers or users. The customer engagement service can help control the content, flow and timing of information and messages sent to a company's customers to provide the customers with an enjoyable and informative experience. The customer engagement service can help determine what individual customers desire and respond well towards, and then manage the flow of information and messaging to customers based on their individual preferences and desires.

The customer engagement service can also cause information and messages to be delivered to customers at opportune times when the information or messaging may have the most influence over customer behavior. Similarly, the customer engagement service may know when certain types of information or messages will have the greatest value to customers, and then seek to deliver those types of information or messages at those times.

The present application describes systems and methods that help marketing personnel create effective and engaging messages that can be sent to a company's customers or users. Ideally, a marketing message sent to a target audience will be engaging for the target audience, causing members of the target audience viewing the message to take a certain action, such as purchasing a certain product. Some messages are more engaging than others. Thus, marketers attempt to design marketing messages to be as engaging as possible.

Unfortunately, an individual generating a message will not necessarily know how to format or phrase the message in ways that make it highly engaging to the target audience. This type of knowledge is typically only gained over years and is based on considerable experience. Thus, individuals who are somewhat new to the process often cannot generate highly engaging messages.

Also, an individual who has considerable experience generating a first type of message that is to be delivered to customers or users via a first message delivery channel may not be aware of how to make a second type of message that is to be delivered via a second different message delivery channel engaging to the target audience. Often the techniques that work to make a first type of message engaging will not work to make a second different type of message engaging.

For all the above reasons, there is a need for systems and methods that can assist an individual in generating messages that will be highly engaging to members of a target audience.

BRIEF DESCRIPTION OF THE DRAWINGS

FIGS. 4-11 are diagrams illustrating steps of a method of generating and editing a message to increase the likelihood that the message will be engaging to members of a target audience;

DETAILED DESCRIPTION OF PREFERRED EMBODIMENTS

Figure 1:
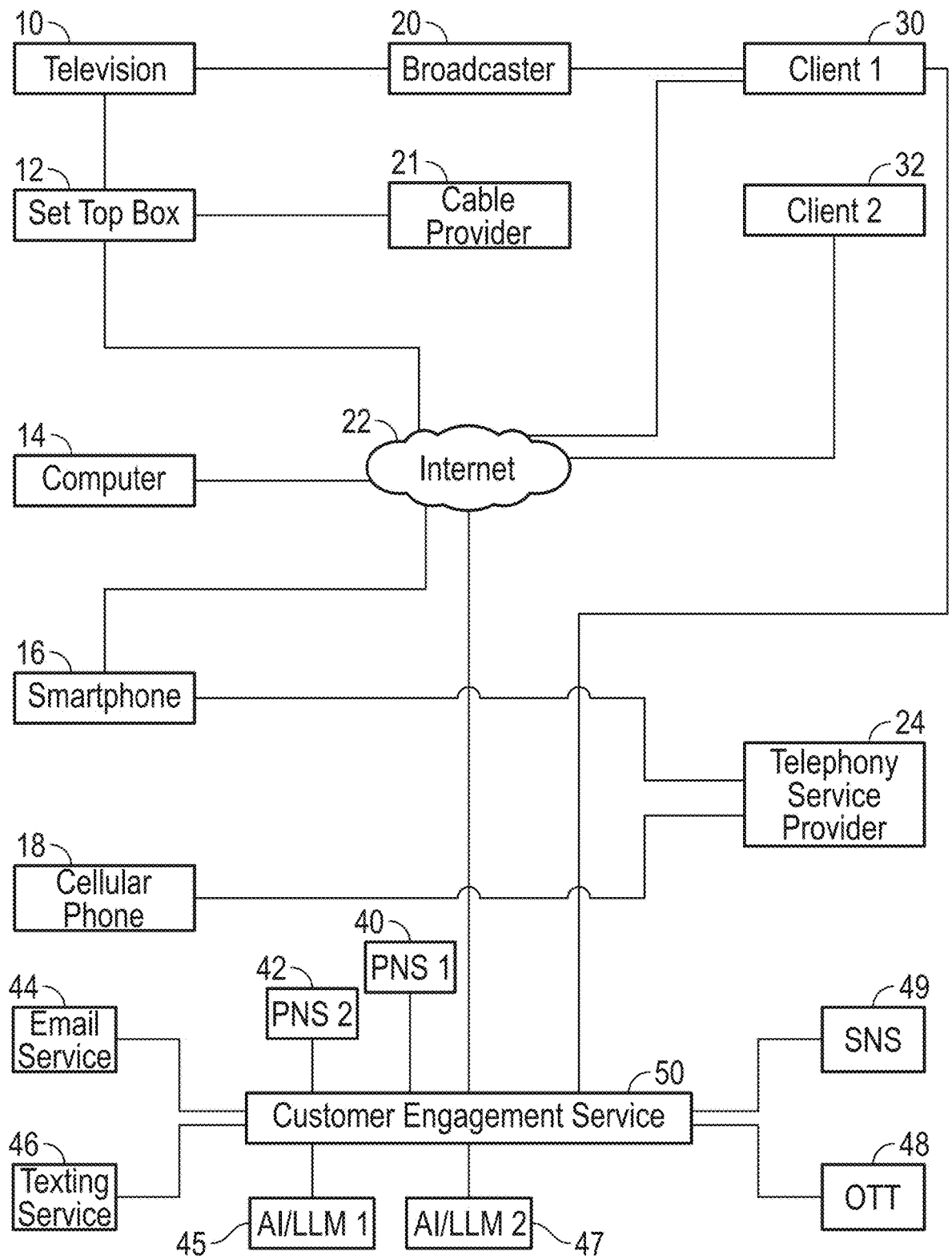
FIG. 1 is a diagram of a communications environment in which the disclosed systems and methods can be practiced.

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue and/or stature. One of the ways that a customer engagement service assists a company is by helping the company to create engaging messages and by helping the company to manage how and when messages are delivered to the company's customers.

The following description refers to "clients" or "companies" and to "users". For purposes of this discussion, a "client" or a "company" would be a client of the customer engagement service. In other words, a client or a company is a business that is being assisted by the customer engagement service. "Users" are a client's or company's users, not users of the customer engagement service. The customer engagement service sits between a client or company and the client's or company's users to help draft messages and to help manage and orchestrate the delivery of messages sent from the client/company to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

A message could also be presented to a user via a content card that is embedded within a company's software application or that is embedded within a company's website. If a content card is embedded in a company's software application, the software application itself would obtain content card data sets from a data service for the content cards that are embedded in the software application. The data service may or may not be part of a customer engagement service. The software application would then use the information in obtained data sets to present information, messages, images, sound recordings and possibly video to the user via the content card embedded in the company's software application.

In the case of content cards that are embedded in a company's website, a web browser software application would be responsible for presenting the website to the user. When a user navigates to a website that includes one or more embedded content cards, the web browser requests data sets for the embedded content cards from a data service. The web browser then uses information in the obtained data sets to present information, messages, images, sound recordings and possibly video to the user via the embedded content card.

For purposes of the following description and for purposes of the appended claims, a "software application" with embedded content cards will refer to both a traditional software application having embedded content cards, as well as a web browser that is presenting a page of a website that includes embedded content cards. Thus, references to a software application with embedded content cards will encompass a web browser presenting a page of a website with embedded content cards.

Messages could also be presented to a user while the user is using an augmented reality software application. In this instance, the customer engagement service and/or a client company could designate a plurality of message placement locations. The message placement locations would be real geographical locations. When a user operating an augmented reality software application aims a camera of his computing device such that one of the designated message placement locations is within the image being generated by the camera, a message could be displayed at the message placement location. The message displayed at the message placement location could be a static image, an animated image, or a video.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

The computer 14 and smartphone 16 may be capable of running an augmented reality software application. In that instance, a message could be displayed to a user if the user, operating the augmented reality software application, points a camera of the computer 14 or smartphone 16 such that a designated message placement location is within the image being generated by the camera. The message would be displayed at the designated message placement location.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

FIG. 1 also illustrates that the customer engagement service 50 may be connected to and utilize the services of first and second artificial intelligence or large language model (AI/LLM) services 45 and 47 for various purposes. In the following description we will explain how the customer engagement service can utilize an AI/LLM service 45, 47 to help generate, edit and improve messages that are being created by a customer company to sent to the company's users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
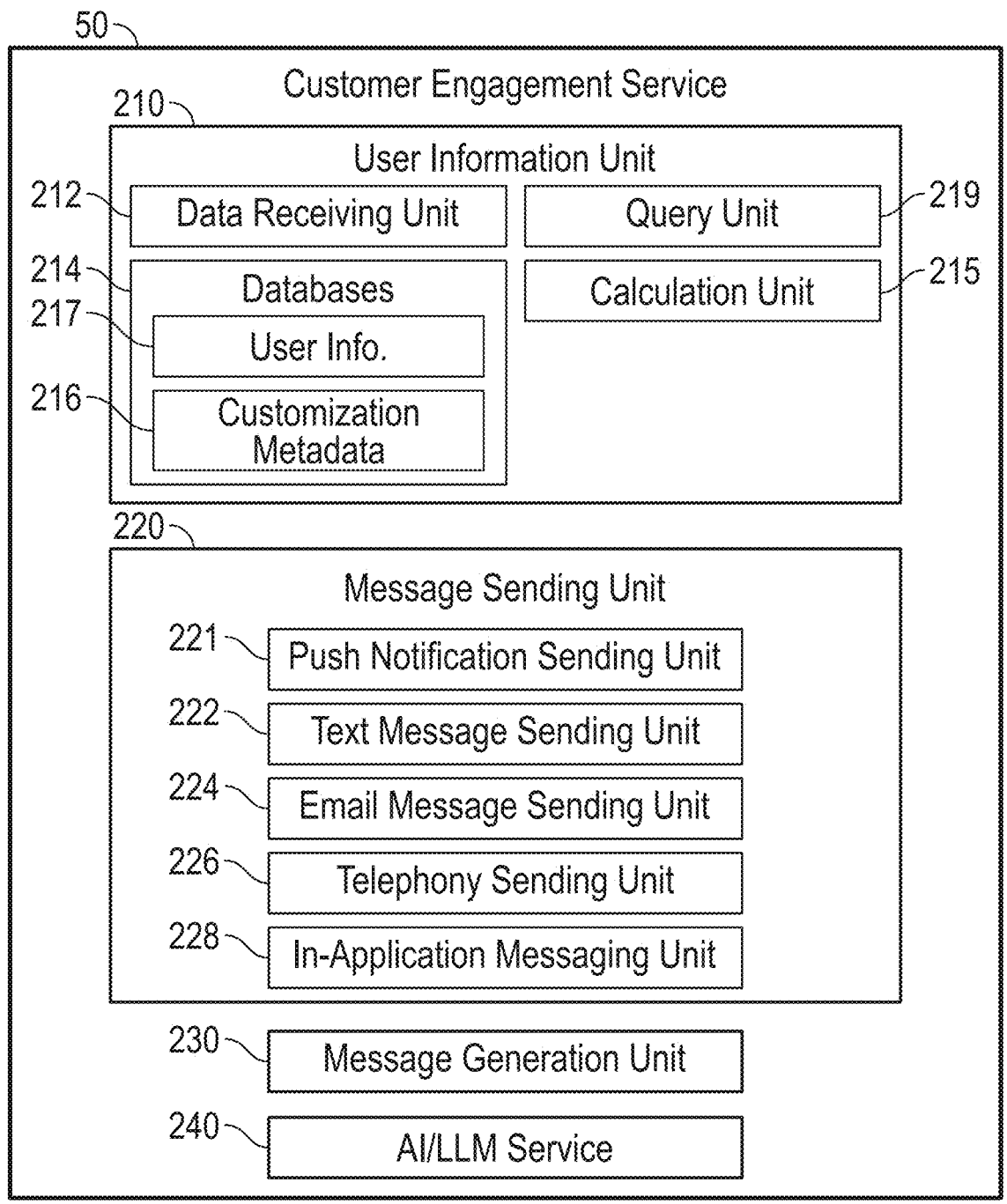
FIG. 2 is a block diagram of elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that user to the data receiving unit 212. As will be explained below, information received by the data receiving unit 212 may satisfy a trigger for causing an in-application message to be presented to a user.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

The databases 214 could include one or more journey metadata databases that includes information about how individual users have progressed though defined "journeys", as discussed above. Thus, when it is necessary to determine what information to insert into a content card that is embedded in a company software application or website, the system may consult the journey metadata database to acquire information about a user's present position in a journey, to thereby determine what message or messages should now be presented to the user via a content card according to the journey rules/parameters.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding a user's contact with the client, the customer engagement service 50 may learn that shortly after an individual user received a message from the client, the user logged into the client's website, or that shortly after the user received a message, the user opened a software application provided by the client. For all of these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device.

The customer engagement service 50 further includes a message generation unit 230, which is discussed in greater detail below. The message generation unit 230 can be used to create and edit messages that are to be electronically delivered to a client company's users.

In some embodiments, the customer engagement service also includes an AI/LLM service 240. The AI/LLM service could be used a variety of different purposes. However, in the context of this discussion the AI/LLM service would be used to help edit and improve messages that are being generated by the message generation unit 230.

In the following description we refer to editing or changing a message to make the message more "engaging" to a user who views and/or interacts with the message. Engagement can mean a variety of different things and the meaning of engagement can depend on the context.

In some instances, making a message more engaging means configuring the message so that a user encountering the message is more likely to read and/or interact with the message. In some instances, making a message more engaging means configuring the message such that a user reading and/or interacting with the message is more likely to take a particular action. In some instance, making a message more engaging can mean both making it more likely that the user will read and/or interact with the message and making it more likely that the user will take a particular action after reading and/or interacting with the message.

Of course, some messages may be designed to make a user refrain from taking a particular action. In that case, making the message more engaging could mean making it more likely that an individual reading and/or interacting with the message will refrain from taking a particular action.

The following description explains how a message generation unit 230 can be used by an individual to generate and edit a message such that the message will be engaging to a target audience. This can include generating an original message, and then editing or altering the message to make the message more engaging.

The original message could be created using a template, or the original message could be created by an individual from scratch. The template used to generate an original message could be one of multiple stock, standard or generic templates that a customer engagement service 50 makes available to its own customers. Alternatively, a company that is a client of the customer engagement service may create its own custom templates that can be used to generate messages for the company to send to its users.

In some instances, it may also be possible to engage the services of an AI/LLM service to have the AI/LLM service draft a message. The creation of an original message with an AI/LLM service could involve the individual providing the AI/LLM service with the overall purpose or intent of the message, and possibly information about a target audience. The AI/LLM service could then generate a message based on input from the individual.

If a particular company has existing custom message templates, an AI/LLM service could make use of those templates to generate an original message for a company, possibly with input from the individual as to the purpose or intent of the message as well as information about the target audience.

Moreover, an AI/LLM service could develop knowledge about a company's typical messaging. Such knowledge could be obtained by the AI/LLM service by reviewing past company messaging and/or by reviewing the messaging that the individual has requested the AI/LLM service to generate for the company over time. This knowledge could also be brought to bear by the AI/LLM service to help draft original messages that will comport with the company's typical messaging formats and message tone. This knowledge could also be used by an AI/LLM service to generate new message templates for a particular company.

From a high-level perspective, once an individual has created an original message the individual can send the original message to an AI/LLM service along with a request for the AI/LLM service to recommend changes to the message that are likely to improve user engagement with the message. The AI/LLM service responds with one or more recommended changes. The individual creating the message could then ask the message generation unit 230 to present the individual with one or more revised versions of the message that include one or more of the changes recommended by the AI/LLM service. The individual creating the message can then select those recommended changes that the individual wishes to make to the original message in order to arrive at a final version of the message, and the message generation unit 230 uses that input to generate a final version of the message that can be sent to a company's users.

Also, if an individual accepts one or more recommendations from the AI/LLM service to create a new version of a message, the individual could then submit that new version of the message back to the AI/LLM service with a renewed request for recommended changes that are likely to improve user engagement. Thus, the process can be iterative in nature, where recommendations from the AI/LLM service are used to create a new message, and that new message is sent back to the AI/LLM service for additional recommendations until the individual is satisfied with the message.

The changes recommended by the AI/LLM service can take various forms. If improving user engagement with a message means making a user more likely to read and/or interact with a message, then the recommended improvements could relate to ways to make the message more eye-catching, such as be altering the font size, color and visual impact of the message. If improving user engagement means making the user more likely to take a particular action, then the recommended improvements could relate to the text in the message. Here again, the way that a message is modified or altered to improve user engagement is very dependent on the context and purpose of the message.

Because different target audiences will be attracted by different things, modifying a message to improve user engagement can also depend on the target audience to which the message will be sent. This is particularly true when the message is designed to get a user reading and/or interacting with a message to take a particular action. For that reason, when the message generation unit 230 sends an original message to an AI/LLM service along with a request for recommendations on how to change the message to improve user engagement, the request could also include information about the target audience to which the message will be sent.

Figure 3:
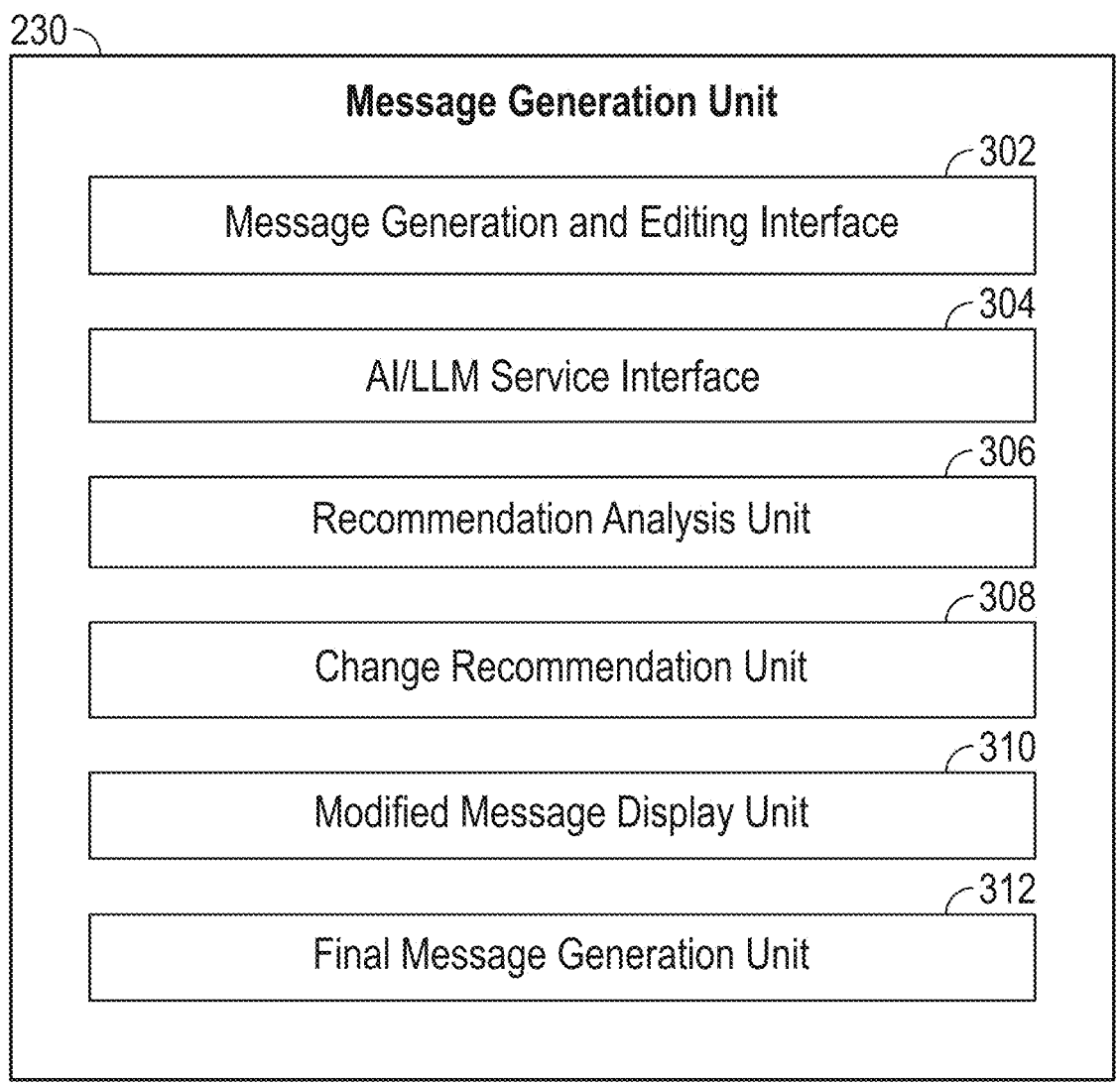
FIG. 3 is a block diagram of selected elements of a message generation unit.

FIG. 3 illustrates selected elements of a message generation unit 230 which can be part of a customer engagement service 50. The message generation unit 230 includes a message editing interface 302. The message editing interface 302 enables an individual to generate and edit a message. The messaging editing interface 302 can enable an individual to generate a new message from scratch. The message editing interface 302 can also allow an individual to select a message template from a variety of pre-existing templates and then modify the template in various ways to create an original message. Modifying the template could include adding text or editing text appearing within the template, modifying the font sizes, font types, colors and graphical elements of the message.

The message generation unit 230 also includes an AI/LLM service interface 304. The AI/LLM service interface 304 acts to send a draft original message created with the message editing interface 302 to an AI/LLM service so that the AI/LLM service can review the original message and recommend changes that could improve user engagement with the message. The AI/LLM service to which the original message is sent could be an AI/LLM service 240 that is a part of the customer engagement service 50. Alternatively, the AI/LLM service could be one external to the customer engagement service 50 such as the AI/LLM services 45 and 47 illustrated in FIG. 1.

The AI/LLM interface 304 may also send information about a target audience that is to receive the message to the AI/LLM service as part of the review request. For this reason, the AI/LLM service interface 304 may include the capability for an individual creating a message to input information about a target audience.

The AI/LLM service interface 304 is also capable of receiving information from an AI/LLM service that includes recommendations for changes to the original message that are intended to improve user engagement with the message. In some embodiments, the AI/LLM service interface 304 could interact with an AI/LLM service via an application programming interface (API) provided by the AI/LLM service.

The message generation unit 230 also includes a recommendation analysis unit 306 which analyzes recommendations which have been provided by an AI/LLM service. This can include analyzing recommended changes to an original message to determine if the recommended changes comport with and/or clash with the overall tone, theme or goal of the original message.

The analysis performed by the recommendation analysis unit 306 can take into account information about the company from which the message will be sent to determine whether recommended changes would result in the message comporting with or clashing with the tone, style or nature of other similar messaging that has been sent from the company to its users in the past. As a result, the recommendation analysis unit 306 may have access to information about the company's prior messaging, and/or information about how the company prefers its messaging to appear to its users.

The recommendation analysis unit 306 may analyze recommended changes to the original message to determine whether the recommended changes are more likely or less likely to improve user engagement with the original message. While the request sent to the AI/LLM service was for recommendations about how to change the original message to increase user engagement, there is no guarantee that the recommendations returned by the AI/LLM service will be ones that actually improve user engagement. Thus, part of an analysis performed by the recommendation analysis unit 308 may be designed to verify that recommended changes would actually improve user engagement with the message. Here again, the recommendation analysis unit 306 may take the target audience to which the message will be sent into consideration when making a determination about whether a particular recommended change is more likely or less likely to increase user engagement with the message.

In some instances, the recommendation analysis unit 306 will assign ranking values to each of the recommended changes returned from the AI/LLM service, where the rankings indicate the degree to which each of the recommendations changes are likely to improve user engagement with the original message. Rankings could include any sort of lettering or numbering system to indicate a degree to which the change corresponding to each recommendation is likely to increase user engagement. Alternatively, the recommendation analysis unit 306 may simply place the recommendations in an order, with the recommended change most likely to increase user engagement being first and the recommendation least likely to increase user engagement last.

The message generation unit 230 further includes a change recommendation unit 308 which presents recommended changes to an individual creating and editing a message. The recommended changes can be presented to the individual in a variety of different ways. However, in one embodiment the change recommendation unit 308 displays the recommendations in such a way that the individual can select or deselect each recommendation. Thus, the change recommendation unit 308 can include a user interface that allows the individual to select certain recommendations to implement in the message, and to reject other recommendations that the individual does not wish to implement in the message.

If the recommendation analysis unit 306 determines that any of the recommendations provided by an AI/LLM service are not likely to increase user engagement, or are likely to decrease user engagement, then the change recommendation unit 308 may not present such recommendations to the individual as selectable options.

The message generation unit 230 also includes a modified message display unit 310 that causes a modified version of the original message to be presented to the individual. The modified version of the original message can include changes corresponding to those recommendations that the individual selected via the change recommendation unit 308.

The change recommendation unit 308 and the modified message display unit 310 can act together to provide an interface that allows the individual creating and editing the message to see how the original message changes when each recommendation is implemented, or when a combination of the recommendations are implemented. The individual may be able to select a new recommendation presented by the change recommendation unit 308, at which point the modified message display unit 310 causes a modified version of the message with the newly selected recommendation to be displayed to the individual. Likewise, if the modified message display unit 310 is causing a modified version of the message to be displayed to the individual that includes a certain recommendation, the individual could deselect one recommendation to cause the modified message display unit 310 to remove the deselected recommended change from the displayed modified message.

The message generation unit 230 also includes a final message generation unit 312 which will generate a final version of a message based on the individual's final selection of the recommendations that are to be implemented in the original message. That final version of the message can then be sent out to the customer's users by one or more elements of the message sending unit 220 of the customer engagement service 50.

Although FIG. 3 illustrates selected elements of a message generation unit 230, in alternate embodiments additional elements may also be present in the message generation unit 230. Also, in different embodiments not all of the elements illustrated in FIG. 3 may be provided in a message generation unit 230. Thus, the depiction provided in FIG. 3 should in no way be considered limiting.

FIGS. 4-11 illustrate various steps of a method of generating and editing a message that will be sent to a customer's users. This method is performed via a user interface 400 that is provided by a message generation unit 230. This user interface could be generated by a software application running on a user's computing device, or the user interface 400 could be accessed as a web application over the Internet.

Figure 4:
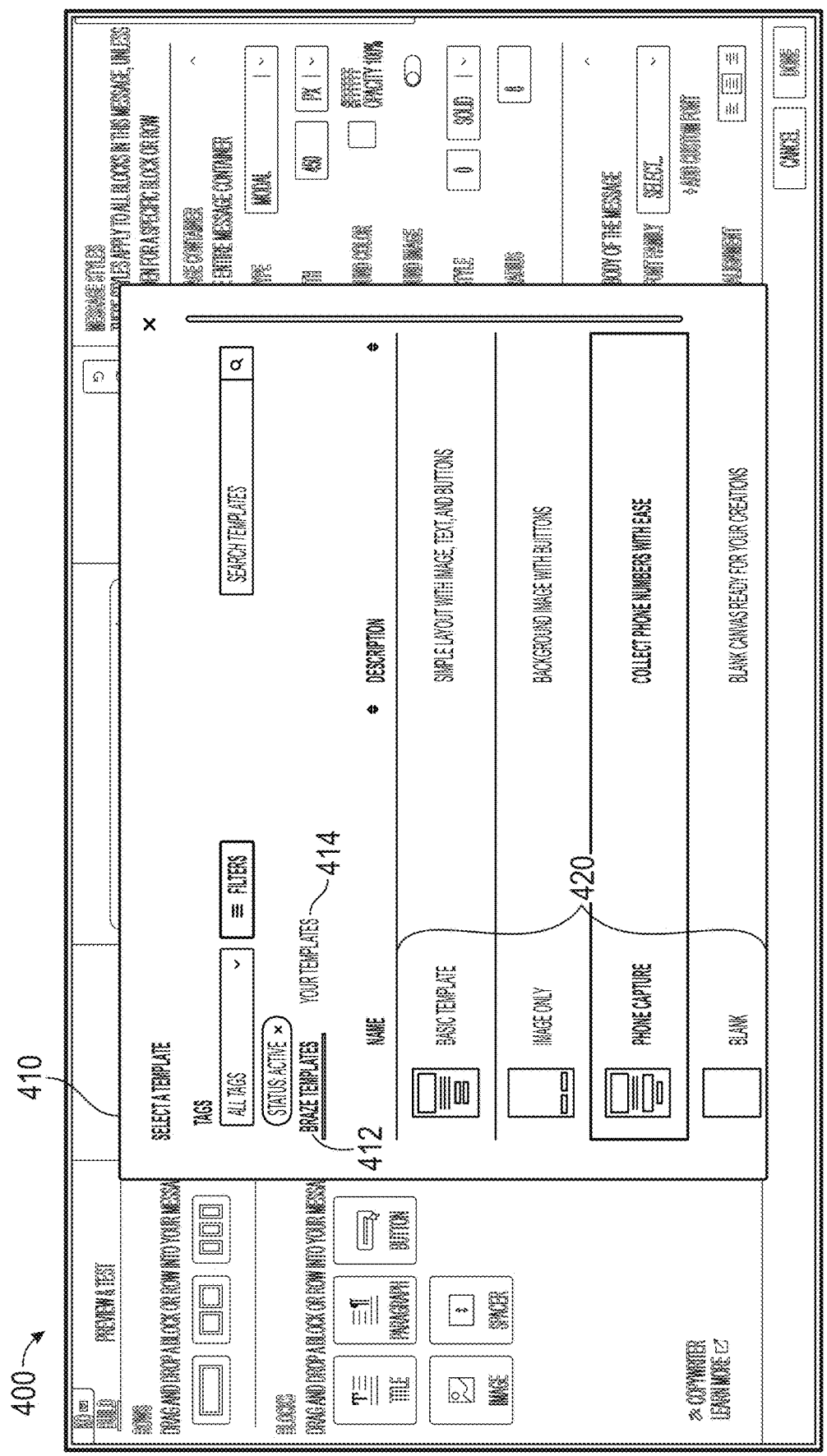

If the message is to be generated based on a preexisting template, the individual generating the message would begin as illustrated in FIG. 4 by selecting a template. The user interface 400 could include a template selection interface 410 which includes a first section 412 that a variety of basic templates and a second section 414 that includes a variety of customized templates. FIG. 4 shows that the individual can make a selection from the first section 412 that includes a plurality of basic templates 420, which are presented to the individual as selectable options. The individual then selects one of the template options in order to begin generating the message.

Figure 5:
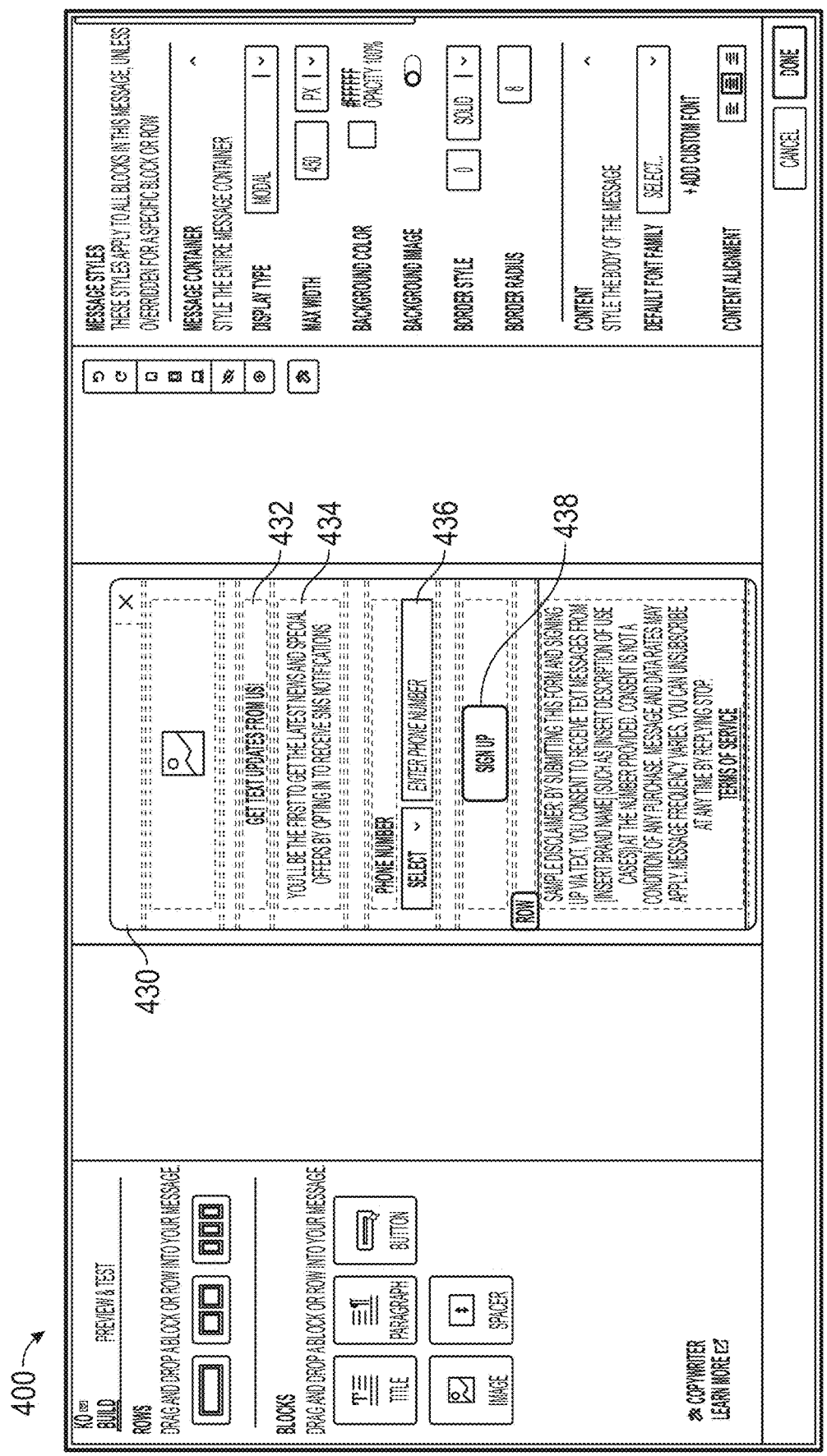

For purpose of this example, we assume that the individual selects the phone capture template for use in generating a message. When the individual selects the phone capture template, the individual is then presented with the phone capture template 430, as depicted in FIG. 5. As shown in FIG. 5, the phone capture template 430 includes a variety of different areas which can be customized in different fashions. This includes a first text region 432 and a second text region 434. The first text region 432 can inform a user of the basic purpose or title of the message. The second text region 434 can include additional information or a more detailed explanation of the purpose of the message. Both the first text region 432 and the second text region 434 contain editable text.

The phone capture template 430 also includes a telephone number entry box 436 into which a user could type a telephone number. Further, the phone capture template 430 includes a selection box 438 that a user can select to cause a telephone number entered in the telephone entry box 436 to be communicated to a third party.

The phone capture template 430 can be altered in a variety of different ways by the individual who is generating the message. This can include editing the text appearing in the first and second text boxes 432, 434. This can also include altering what happens when a user attempts to enter a telephone number in the telephone entry box 436. Further, it may be possible to alter the template such that a variety of different things happen when a user hovers a selection icon over one or more of the boxes appearing in the template. For example, one could add a hover effect to the telephone number entry box 436 such that when a user hovers a selection icon over the telephone number entry box 436, a help message appears. The text of such a help message could also be editable.

Figure 6:
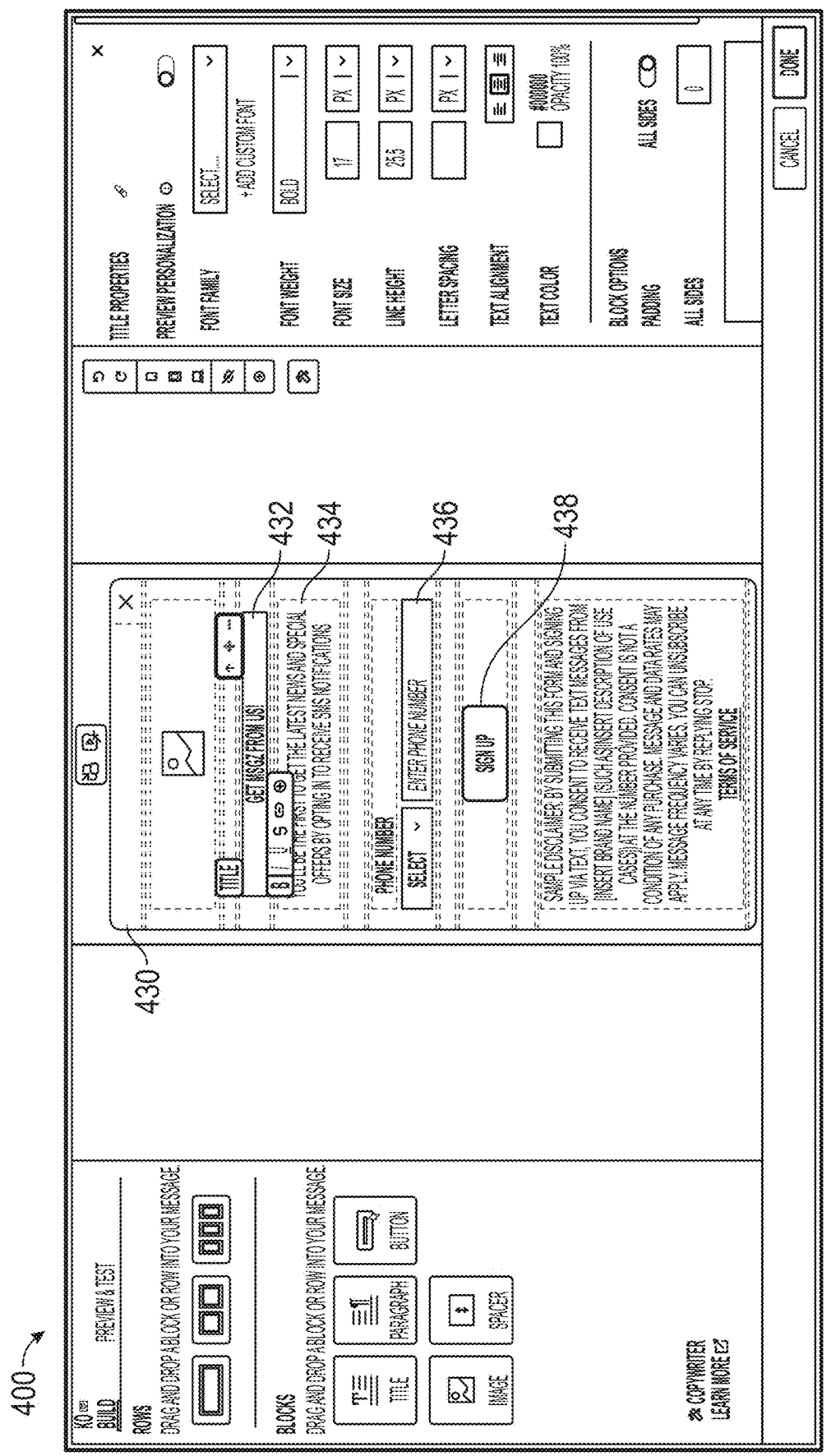

For purposes of this discussion, we will assume the individual creating the message first wishes to edit the text appearing in the first text entry box 432. FIG. 6 shows that the individual has placed a selection icon in the first text entry box 432 which calls up a text editing interface. This allows the individual to edit the text in this first text entry box 432 from "Get text updates from us!" to instead read instead "Get MSGZ from us!". The individual would then save that change to the basic template.

Figure 7:
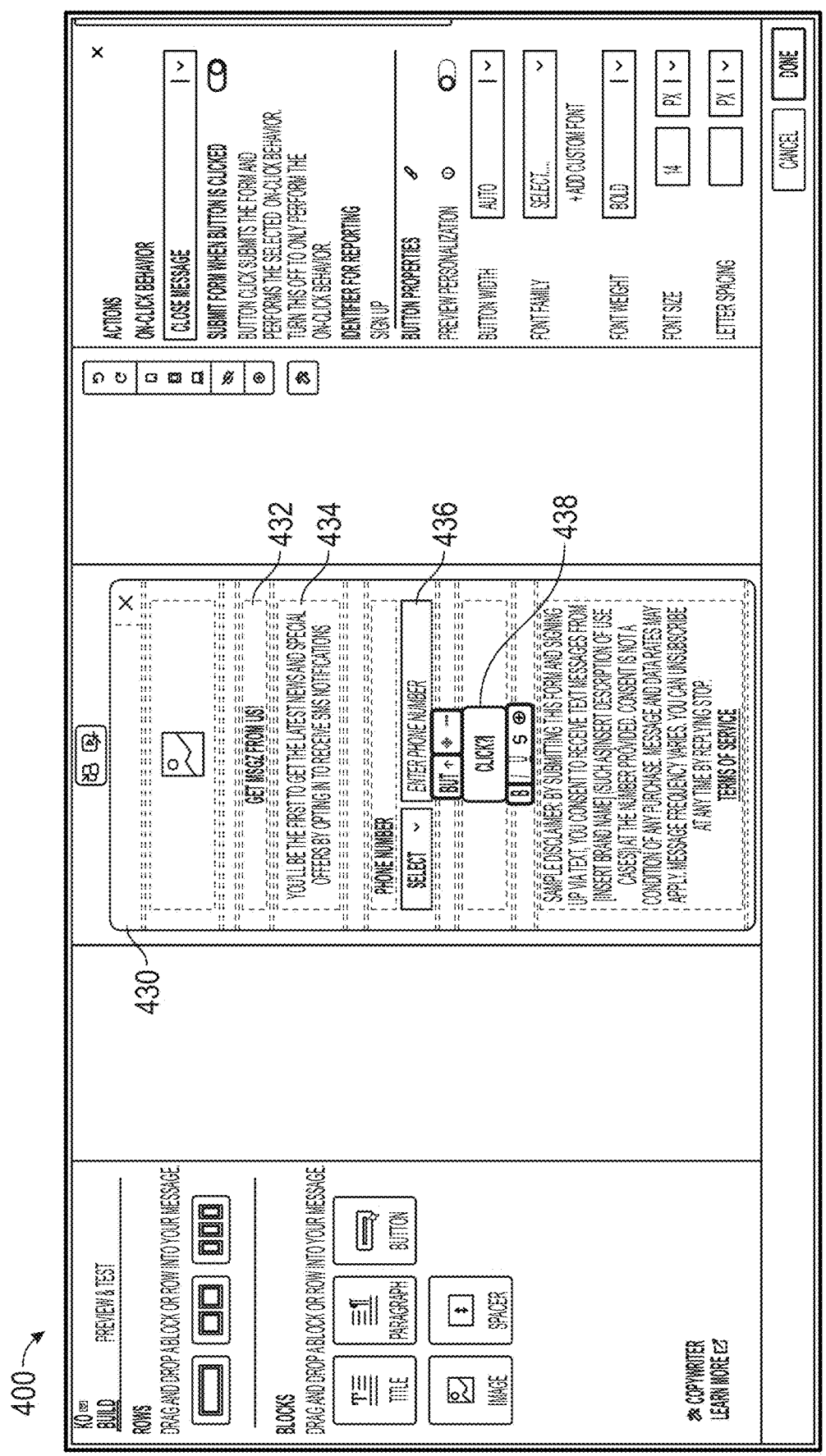

For purposes of this discussion, we will assume that the individual then wishes to alter the text appearing in the selection box 438 of the phone capture template 430. FIG. 7 illustrates that the individual has changed the text in the selection box 438 from "Sign Up" to "Click?".

For purposes of this discussion, we will assume that the individual does not wish to make any further changes to the basic phone capture template 430. However, the individual could then ask for recommendations about how this message could be changed to improve user engagement with the message.

Figure 8:
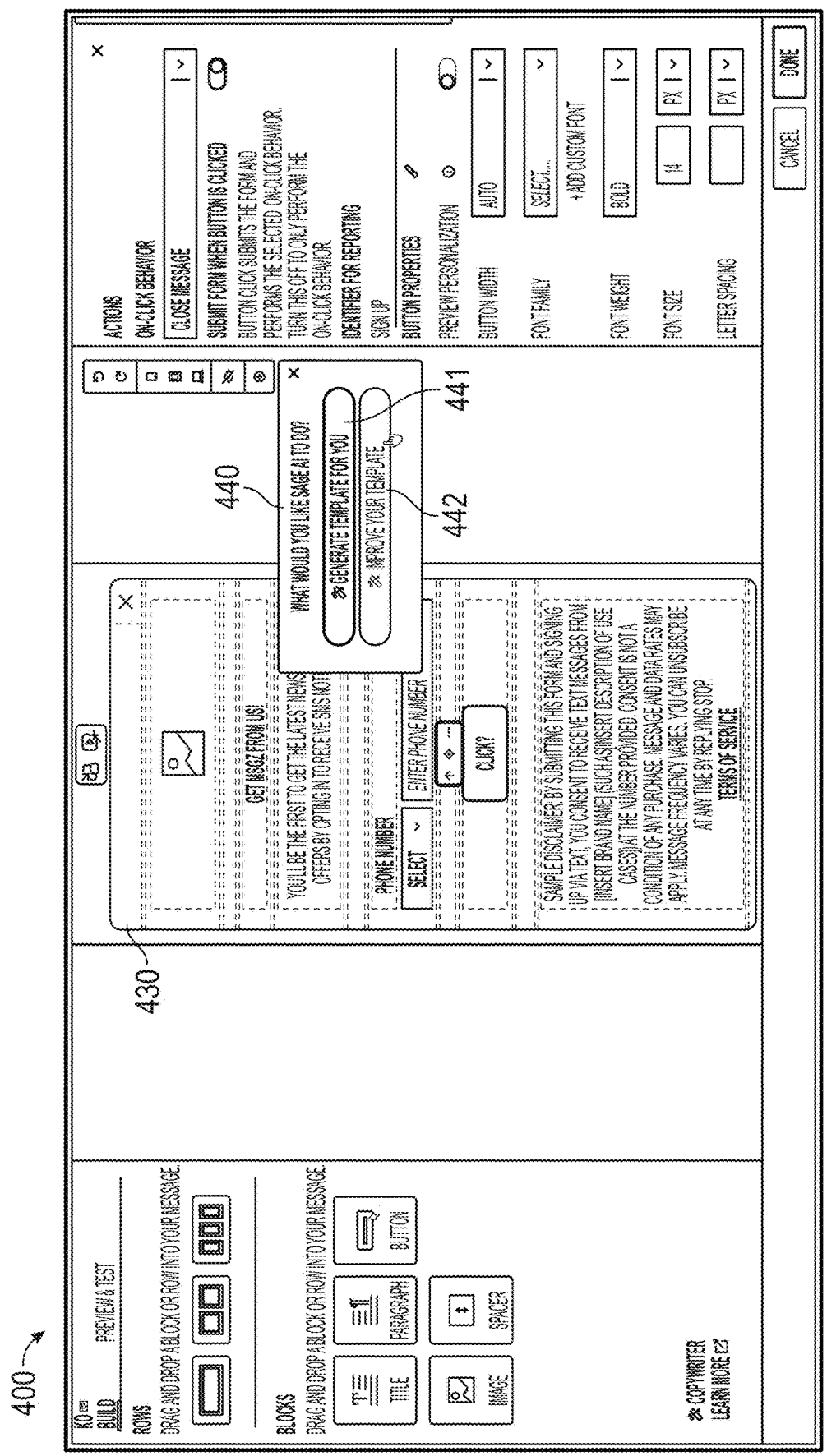

FIG. 8 shows that a popup box 440 includes two options. The individual can choose a first option 441 to cause the displayed edited version of the template to be converted in a final version of a message that can be sent to a company's users. Alternatively, the individual could select a second option 442 that will request recommendations for how the message could be changed to increase user engagement with the message.

For purposes of this explanation, we will assume that the individual selects the second option 442, requesting recommendations about how the message could be changed to improve user engagement. When the individual requests recommendations, the AI/LLM service interface 304 of the message generation unit 230 would send the edited version of the message template to an AI/LLM service along with a request to review the original message and to provide recommendations for changes that are likely to improve user engagement with the message. In some instances, the AI/LLM service would be a part of the customer engagement service itself. Alternatively, the AI/LLM service could be a third-party service.

The AI/LLM service would then review the original message as edited by the individual creating the message to identify ways in which the original message could be changed to improve user engagement. The AI/LLM service would then send those recommendations back to the message generation unit 230.

In some instances, all of the recommendations provided by the AI/LLM service could be presented to the individual. In other instances, a recommendation analysis unit 306 of the message generation unit 230 could review each of the recommendations provided by the AI/LLM service to determine whether any of the recommendations are likely to decrease user engagement with the message. If there are recommendations which are determined to be likely to decrease customer engagement, those recommendations would not be presented to the individual generating the message.

Figure 9:
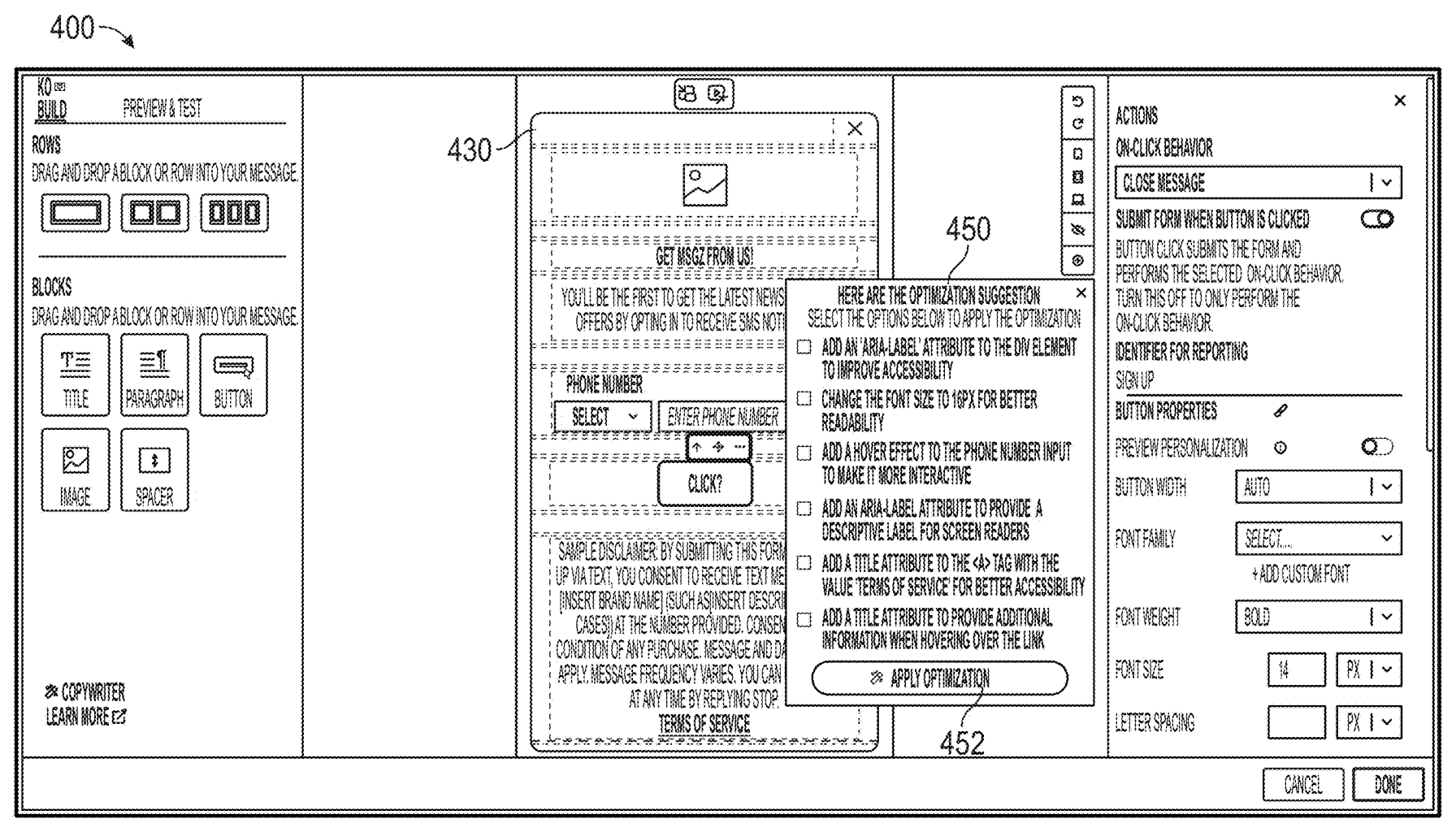

As shown in FIG. 9, the individual would then be presented with a selectable list of one or more of the recommendations provided by the AI/LLM service in a recommendation window 450. In the example illustrated in FIG. 9, the recommendation window 450 includes multiple different recommendations for how the message could be changed to potentially improve user engagement. The recommendation window 450 also includes selectable check boxes next to each of the recommendations. This allows the individual to select those recommendations that the user wishes to implement in the original message.

Figure 10:
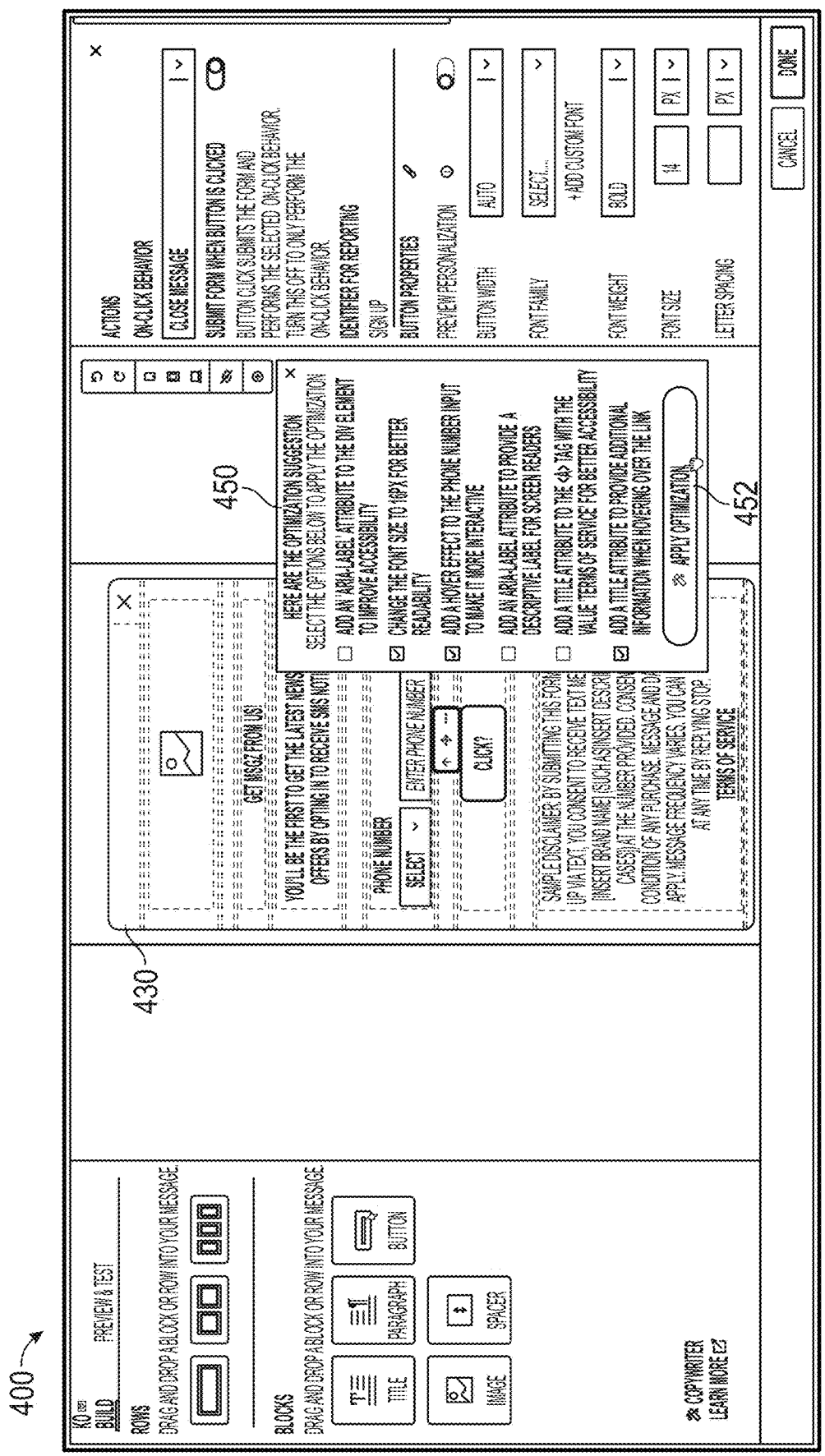

FIG. 10 shows the recommendation window 450 after the individual has selected the second, third, and sixth recommendations. The individual would then click on the apply optimization button 452 to cause the displayed message to be updated to include the selected recommended changes.

Figure 11:
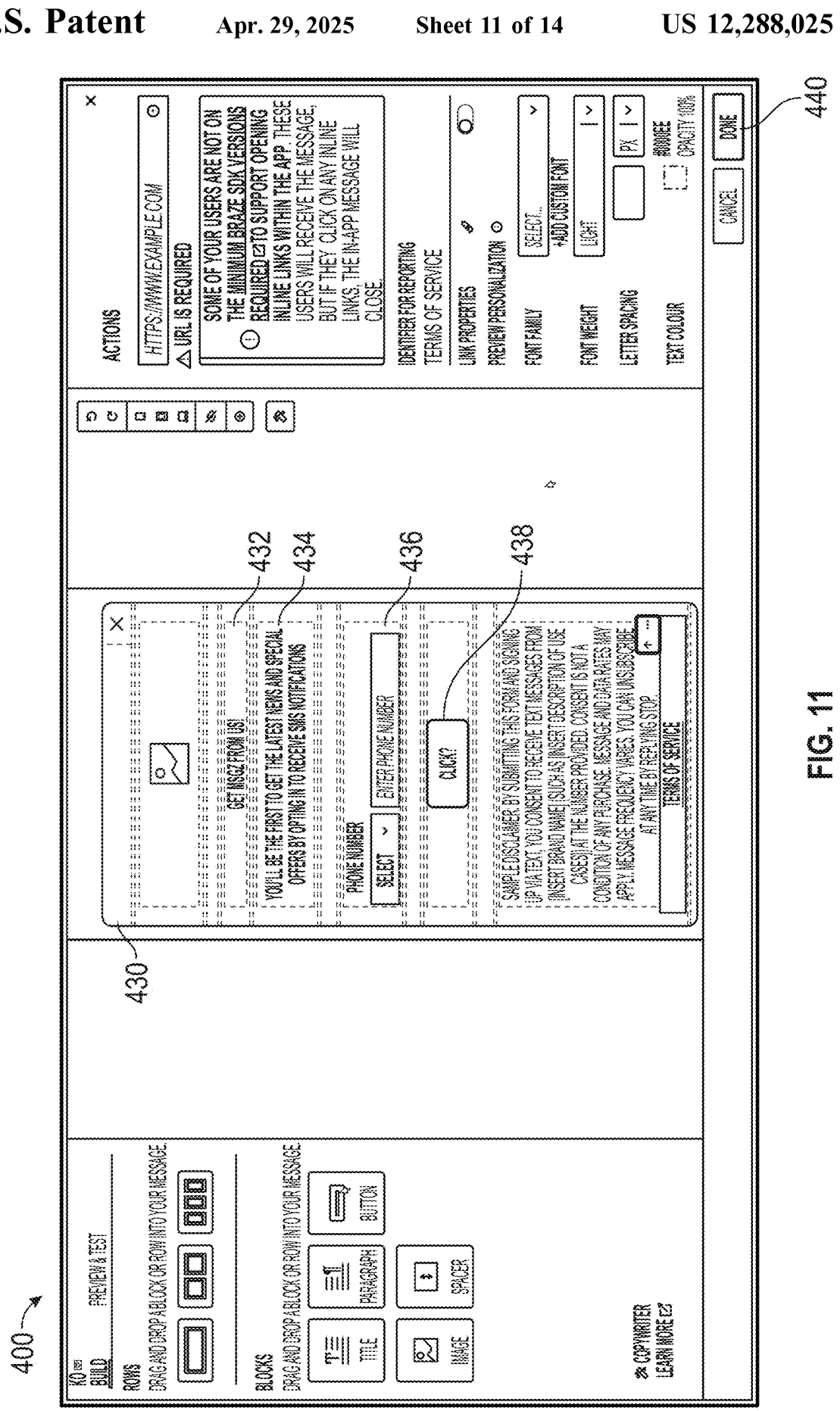

At this point, a modified message display unit 310 would implement the selected recommendations and present the individual with a modified version of the message that includes the selected recommended changes, as illustrated in FIG. 11. This includes changing the font size of the text appearing in the first text box 432 and the second text box 434, which corresponds to the second selected recommendation appearing in the recommendation window 450 illustrated in FIG. 10. While not illustrated in FIG. 11, the message would also be altered to add a hover effect to the phone number input box 436, and to add a title attribute to provide additional information when a user hovers a selection icon over the link, which correspond to the first and sixth selected recommendations appearing in the recommendation window 450 in FIG. 10.

If the individual wishes to accept this version of the edited message, as illustrated in FIG. 11, the individual could select a done button 440 to have a final message generation unit 312 of the message generation unit 230 generate a final version of the message that can be sent to a customer's users. Alternatively, the individual could back up a step to return to what is depicted in FIG. 10. This would allow the individual to either remove one or more of the selections from the displayed recommendations and/or to select additional ones of the recommendations. At that point, the individual would be presented with a new version of the message that includes the selected recommendations. Once the individual is satisfied with the message, the individual would ultimately click on the done button 440 to have the final message generation unit 312 generate a final version of the message ready to send to a company's users.

Figure 12:
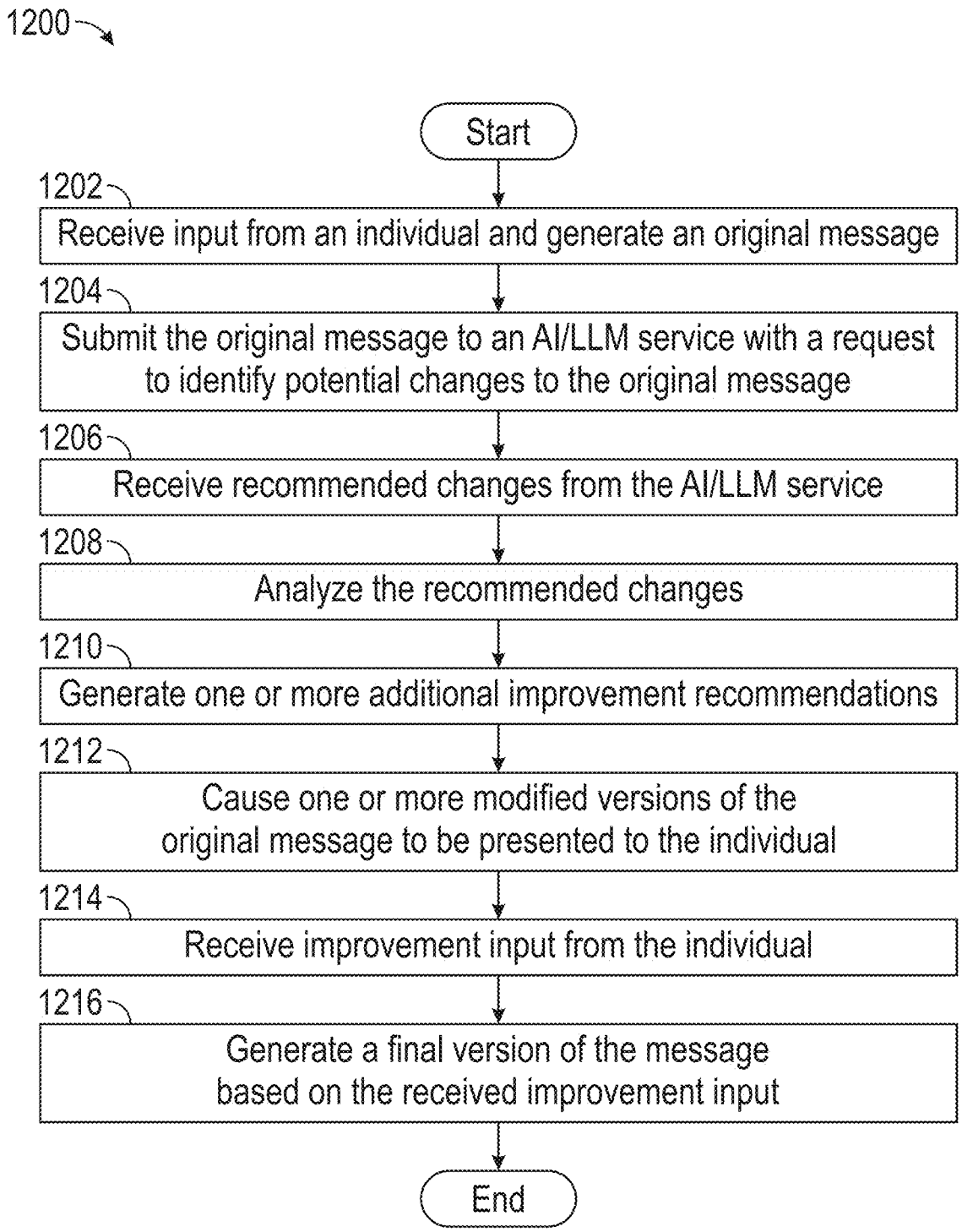
FIG. 12 is a flow diagram illustrating a method of generating and editing a message.

FIG. 12 illustrates the steps the method that would be performed by elements of a message generation unit 230 as an individual creates and edits a message that is to be sent to a company's users. The method 1200 begins and proceeds to step 1202 in which a message editing interface 302 receives input from an individual in order to generate an original version of a message.

As illustrated in connection with FIGS. 4-11, step 1202 can include presenting the individual with a message template, and receiving input from the individual about how the template should be modified. Modifications could include entering text in one or more text entry boxes of the message template or editing the existing text within the message template. The input received from the individual could include modifying the graphical elements of the message template, altering text sizes or fonts, modifying background to text colors, or any of a variety of other actions to customize the message template.

In alternate embodiments, rather than modifying a message template step 1202 could include the individual using the message editing interface 302 to create an entirely new message from scratch. This could include creating both text and graphical elements for the new message.

Regardless of how an original message is created, at the end of step 1202 there will be an original message that is the individual's first attempt at generating a message that can be sent to a company's users.

Next, in step 1204, the original message created in step 1202 is sent to an AI/LLM service using the AI/LLM service interface 304. The original message is sent along with a request for recommendations about how the original message could be changed to increase user engagement with the message. As mentioned above, the information sent to the AI/LLM service may include information about the target audience to which the message will be sent to help the AI/LLM service determine what changes to the original message are likely to increase user engagement with the message.

The AI/LLM service would review the draft original message and generate recommendations which are then sent back to the AI/LLM service interface 304. Step 1206 involves the AI/LLM service interface 304 receiving the recommended changes from the AI/LLM service.

The method then proceeds to step 1208 where a recommendation analysis unit 306 of the message generation unit 230 analyzes the recommended changes provided by the AI/LLM service. As explained above, this can include checking each of the recommended changes to ensure that each recommended change comports with and does not clash with the overall tone, theme or goal of the message. In addition the analysis performed in step 1208 can include checking to determine if any of the recommended changes are likely to decrease, rather than increase, customer engagement with the message. Moreover, the analysis performed in step 1208 can include ranking and/or ordering the recommended changes in terms of their likelihood of increasing customer engagement with the message.

The method then proceeds to step 1210, which is an optional step. Step 1210 would involve the message generation unit 230 itself generating one or more recommendations about how the message could be changed to increase user engagement with the message. These recommendations would not come from an AI/LLM service. Instead, these recommendations would come from the change recommendation unit 308 of the message generation unit 230.

Step 1210 could be performed before a request for recommendations is sent to the AI/LLM service in step 1204, after recommendations are received from the AI/LLM service in step 1206, or step 1210 could be performed at the same time that a request for recommendations is sent to the AI/LLM service and/or while waiting for the AV/LLM service to respond. Thus, the depiction provided in FIG. 12 should not be considered limiting as to the order in which the steps are performed.

The method then proceeds to step 1212 in which a modified message display unit 310 causes one or more modified versions of the original message to be presented to the individual. This can be accomplished as depicted in FIGS. 10 and 11, where the individual creating the message is given an opportunity to select which of the recommended changes are to be implemented in the message and displayed as an edited version of the message. As explained above, the change recommendation unit 308 and the modified message display unit 310 can act together to cause a variety of different edited versions of the original message to be presented to the individual. This allows the individual to see how each of the recommended changes alters the original message, and how a combination of recommended changes would appear.

The method then proceeds to step 1214 which includes receiving improvement input from the individual. The improvement input would be in the nature of a final selection of the recommended changes that are to be made to the original message to arrive at a final version of the message that can be sent to a company's users. This could be accomplished using a recommendation box 450 as depicted in FIG. 10. Alternatively, the improvement input received from the individual could be obtained in various other ways. In the end, however, the individual indicates which of the recommended changes the individual wishes to implement in the original message.

The method then proceeds to step 1216 where a final message generation unit 312 generates a final version of the method which includes those recommended changes selected by the individual. The method then ends.

Figure 13:
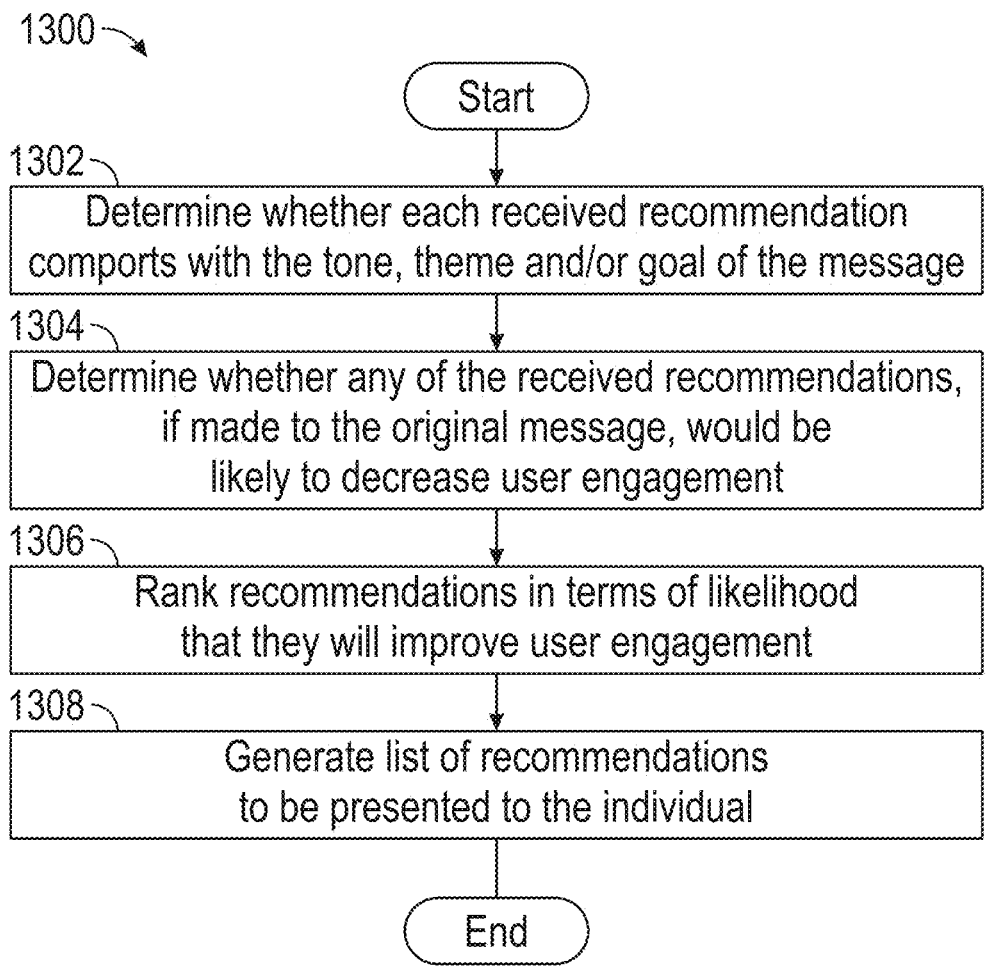
FIG. 13 is a flow diagram of a method of generating recommendations to improve a message.
Figure 14:
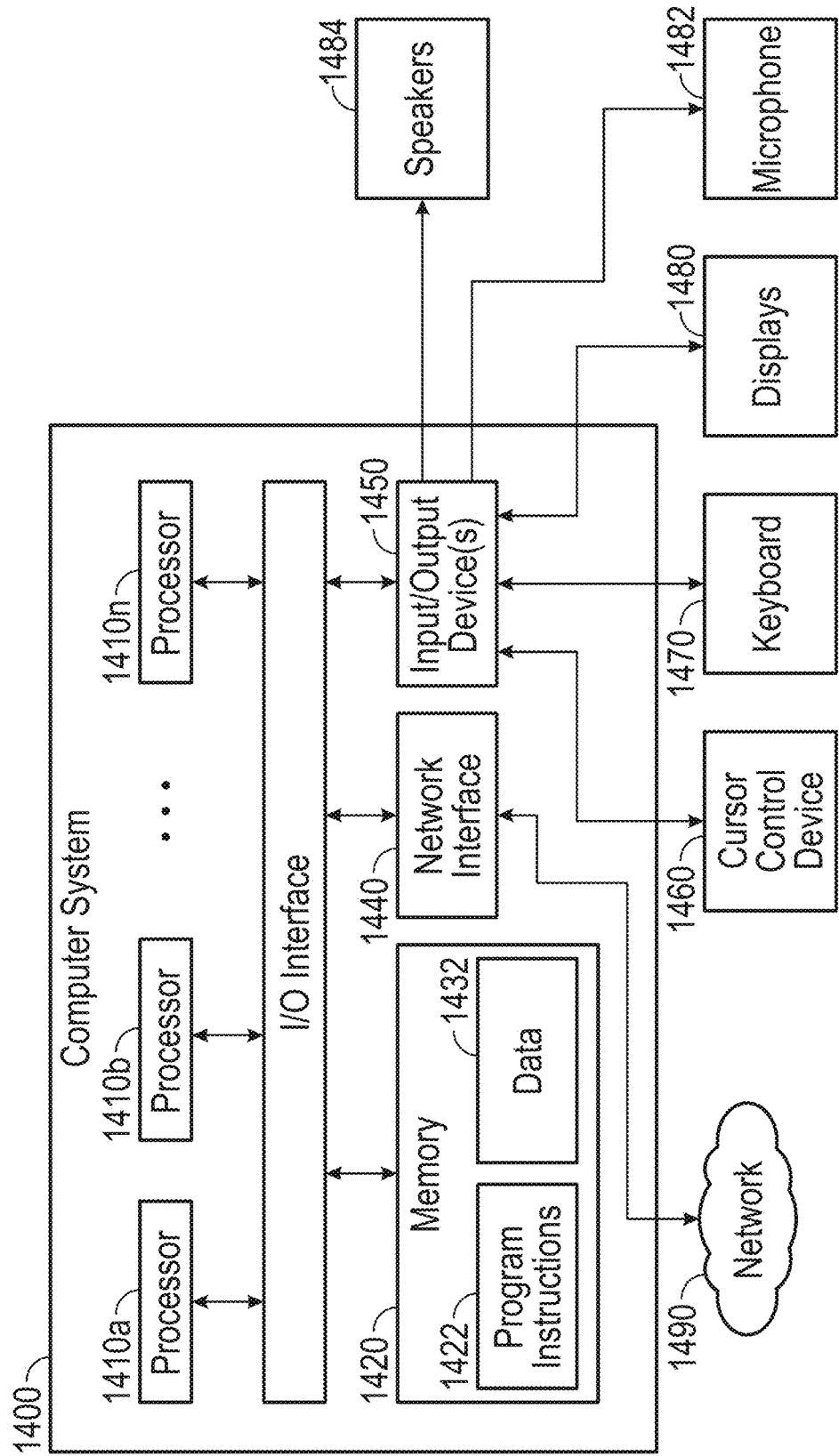
FIG. 14 is a diagram of a computer system and associated peripherals which could embody the disclosed systems or which could be used to practice the disclosed methods.

FIG. 13 depicts steps of a method which corresponds to step 1208 of the method illustrated in FIG. 12. This method 1300 involves reviewing recommended changes provided by an AI/LLM service to determine whether the recommended changes are worth presenting to the individual creating the message. This can also include ranking recommended changes in terms of their likelihood of increasing user engagement with the message. The steps of this method 1300 would be performed by the recommendation analysis unit 306 of a message generation unit 230.

The method 1300 starts and proceeds to step 1302 where a recommendation analysis unit 306 of the messaging editing unit 230 determines whether each change recommendation received from an AI/LLM service comports with the tone, theme and/or goal of the message. If one of the recommended changes does not comport with the tone, theme and/or goal of the message, that recommendation may never be presented to the individual generating the message as an option for modifying the original message.

The method then proceeds to step 1304 in which the recommendation analysis unit 306 determines whether any of the received recommendations, if made to the original message, would be likely to decrease user engagement with the message. As mentioned above, this determination could take into account the target audience to which the message will be sent. If any of the recommendations are determined to be likely to decrease user engagement, those recommendations also may never be presented to the individual generating the message.

In step 1306 the recommendation analysis unit 306 ranks each of the recommendations in terms of the likelihood that the recommended change will increase user engagement. The assigned rankings may be helpful in indicating to the individual generating the message which of the recommendations are most likely to increase user engagement with the message.

Step 1308 is an optional step which involves the recommendation analysis unit 306 generating a list of recommendations that are ordered based on the likelihood that each recommendation will increase user engagement with the message. The recommendations may be presented to the individual generating the message in this order to thereby indicate which of the recommendations are most likely to result in increased user engagement with the message.

As explained above, if any of the recommended changes are determined to not comport with the tone, theme and/or goal of the message, that recommendation may not be part of the ranked list created in step 308. Likewise, if any of the recommendations are determined to be likely to decrease user engagement, that recommendation also may not be part of the ranked list generated in step 1308. Alternatively, the recommendations which do not comport with the tone, theme and/or goal of the message or which are likely to decrease user engagement could be ranked at the bottom of the list generated in step 1308. The method then ends.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 7 depicts a computer system 700 that can be utilized in various embodiments of the present invention to implement the invention according to one or more embodiments. The various embodiments as described herein may be executed on one or more computer systems, which may interact with various other devices. One such computer system is the computer system 700 illustrated in FIG. 7. The computer system 700 may be configured to implement the methods described above. The computer system 700 may be used to implement any other system, device, element, functionality or method of the above-described embodiments. In the illustrated embodiments, the computer system 700 may be configured to implement the disclosed methods as processor-executable executable program instructions 722 (e.g., program instructions executable by processor(s) 710) in various embodiments.

In the illustrated embodiment, computer system 700 includes one or more processors 710a-710n coupled to a system memory 720 via an input/output (I/O) interface 730. Computer system 700 further includes a network interface 740 coupled to I/O interface 730, and one or more input/output devices 750, such as cursor control device 760, keyboard 770, display(s) 780, microphone 782 and speakers 784. In various embodiments, any of the components may be utilized by the system to receive user input described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, the computer system 700 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the operations and methods described above, such as the methods illustrated by the flowcharts of FIGS. 4-6. In other embodiments, different elements and data may be included.

Those skilled in the art will appreciate that the computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A processor-implemented method of generating a message to be sent electronically to a user, comprising:
   receiving input from an individual that is to be used to create an original message;
   creating an original message based on the user input;
   submitting the original message to an artificial intelligence or large language model (AI/LLM) service along with a request to identify potential changes to the original message that could improve user engagement with the message;
   receiving, from the AI/LLM service, one or more change recommendations about how the original message could be changed to potentially improve user engagement with the message;
   analyzing the received change recommendations to determine whether any of the received change recommendations, if made to the original message to create a changed message, would be likely to decrease user engagement with the changed message;
   causing at least one modified version of the message to be generated and presented to the individual, each at least one modified version of the message incorporating a change to the original message corresponding to at least one of the change recommendations;
   receiving improvement input from the individual as to which of the change recommendations the individual wishes to implement in the original message to create a final version of the messages, wherein the improvement input is based, at least in part, on the result of the analyzing step; and
   generating a final version of the message based on the received improvement input, the final version of the message including changes to the original message that correspond to those change recommendations the individual wishes to implement.

2. The method of claim 1, further comprising analyzing the received change recommendations to identify those of the received change recommendations that, if made to the original message, are likely to increase user engagement with the changed message.

3. The method of claim 1, wherein when the received change recommendations include more than one change recommendation, the method further comprises assigning an improvement ranking number to each of the received change recommendations, wherein the assigned improvement ranking numbers are indicative of the degree to which each change recommendation is likely to improve user engagement with the message.

4. The method of claim 3, wherein the improvement ranking numbers are assigned to the received change recommendations based, at least in part, on the type of change that is being recommended.

5. The method of claim 1, wherein causing at least one modified version of the message to be generated and presented to the individual comprises causing a plurality of different modified versions of the message to be generated and presented to the individual, wherein each of the plurality of different modified versions of the message includes a change corresponding to a different one of the change recommendations.

6. The method of claim 1, wherein causing at least one modified version of the message to be generated and presented to the individual comprises causing a modified version of the message that includes multiple changes corresponding to multiple received change recommendations to be generated and presented to the individual.

7. The method of claim 1, further comprising receiving tentative improvement input from the user by:
   displaying to the individual a list of the received change recommendations; and
   receiving from the individual a selection of one or more of the received change recommendations on the displayed list; and wherein the at least one modified version of the message that is generated and presented to the individual includes changes corresponding to those change recommendations the user selected from the displayed list.

8. The method of claim 1, wherein if any of the received change recommendations are determined to be likely to decrease user engagement with the message, the causing step comprises causing a modified version of the message to be presented to the individual that does not include a change corresponding to the change recommendation that is determined to be likely to decrease user engagement.

9. The method of claim 1, further comprising analyzing the change recommendations to determine whether any of the received change recommendations is likely to clash with the overall tone, theme or goal of the original message.

10. The method of claim 9, wherein if any of the received change recommendations are determined to be likely to clash with the overall tone, theme or goal of the original message, the causing step comprises causing a modified version of the message to be presented to the individual step that does not include a change corresponding to a change recommendation that is determined to be likely to clash with the overall tone theme or of the original message.

11. The method of claim 1, wherein the submitting step further comprises sending information about a target audience to which the message will be sent to the AI/LLM service along with the request to identify potential changes to the original message that could improve user engagement with the message.

12. A non-transitory computer-readable medium bearing instructions that, when performed by one or more processors, cause the one or more processors to perform a method comprising:
   receiving input from an individual that is to be used to create an original message;
   creating an original message based on the user input;
   submitting the original message to an artificial intelligence or large language model (AI/LLM) service along with a request to identify potential changes to the original message that could improve user engagement with the message;
   receiving, from the AI/LLM service, one or more change recommendations about how the original message could be changed to potentially improve user engagement with the message;
   analyzing the received change recommendations to determine whether any of the received change recommendations, if made to the original messages to create a changed message, would be likely to decrease user engagement with the changed message;
   causing at least one modified version of the message to be generated and presented to the individual, each at least one modified version of the message incorporating a change to the original message corresponding to at least one of the change recommendations;
   receiving improvement input from the individual as to which of the change recommendations the individual wishes to implement in the original message to create a final version of the message, wherein the improvement input is based, at least in part, on the result of the analyzing step; and
   generating a final version of the message based on the received improvement input, the final version of the message including changes to the original message that correspond to those change recommendations the individual wishes to implement.

13. The non-transitory computer readable medium of claim 12, wherein the method performed by the one or more processors further comprises analyzing the received change recommendations to identify those of the received change recommendations that, if made to the original message, are likely to increase user engagement with the changed message.

14. The non-transitory computer readable medium of claim 12, wherein when the received change recommendations include more than one change recommendation, the method further comprises assigning an improvement ranking number to each of the received change recommendations, wherein the assigned improvement ranking numbers are indicative of the degree to which each change recommendation is likely to improve user engagement with the message.

15. The non-transitory computer readable medium of claim 14, wherein the improvement ranking numbers are assigned to the received change recommendations based, at least in part, on the type of change that is being recommended.

16. The non-transitory computer readable medium of claim 12, wherein causing at least one modified version of the message to be generated and presented to the individual comprising causing a plurality of different modified versions of the message to be generated and presented to the individual, wherein each of the plurality of different modified versions of the message includes a change corresponding to a different one of the change recommendations.

17. The non-transitory computer readable medium of claim 12, wherein causing at least one modified version of the message to be generated and presented to the individual comprises causing a modified version of the message that includes multiple changes corresponding to multiple received change recommendations to be generated and presented to the individual.

18. The non-transitory computer readable medium of claim 12, wherein the method performed by the one or more processors further comprises receiving tentative improvement input from the user by:
   displaying to the individual a list of the received change recommendations; and
   receiving from the individual a selection of one or more of the received change recommendations on the displayed list; and
   wherein the at least one modified version of the message that is generated and presented to the individual includes changes corresponding to those change recommendations the user selected from the displayed list.

19. The non-transitory computer readable medium of claim 12, wherein if any of the received change recommendations are determined to be likely to decrease user engagement with the message, the causing step comprises causing a modified version of the message to be presented to the individual step that does not include a change corresponding to the change recommendation that is determined to be likely to decrease user engagement.

20. The non-transitory computer readable medium of claim 12, wherein the method performed by the one or more processors further comprises analyzing the change recommendations to determine whether any of the received change recommendations is likely to clash with the overall tone, theme or goal of the original message.

21. The non-transitory computer readable medium of claim 20, wherein if any of the received change recommendations are determined to be likely to clash with the overall tone, theme or goal of the original message, the causing step comprises causing a modified version of the message to be presented to the individual that does not include a change corresponding to a change recommendation that is determined to be likely to clash with overall tone, theme or goal of the original message.

22. The non-transitory computer readable medium of claim 12, wherein the submitting step further comprises sending information about a target audience to which the message will be sent to the AI/LLM service along with the request to identify potential changes to the original message that could improve user engagement with the message.

* * * * *